(12) United States Patent
Mohalley et al.

(10) Patent No.: US 12,055,307 B2
(45) Date of Patent: Aug. 6, 2024

(54) SYSTEMS AND METHODS FOR CONTROLLING A MOTOR

(71) Applicant: Regal Beloit America, Inc., Beloit, WI (US)

(72) Inventors: Christopher A. Mohalley, Racine, WI (US); Bryan J. Stout, Forth Wayne, IN (US); Malcolm E. Cole, Fort Wayne, IN (US); Gregory P. Sullivan, Fort Wayne, IN (US)

(73) Assignee: Regal Beloit America, Inc., Milwaukee, WI (US)

( * ) Notice: Subject to any disclaimer, the term of this patent is extended or adjusted under 35 U.S.C. 154(b) by 0 days.

(21) Appl. No.: 18/155,603

(22) Filed: Jan. 17, 2023

(65) Prior Publication Data

US 2023/0151990 A1    May 18, 2023

Related U.S. Application Data

(63) Continuation of application No. 15/618,846, filed on Jun. 9, 2017, now abandoned.

(51) Int. Cl.
*F24F 11/30* (2018.01)
*F24F 11/62* (2018.01)
*F24F 11/77* (2018.01)

(52) U.S. Cl.
CPC .............. *F24F 11/30* (2018.01); *F24F 11/62* (2018.01); *F24F 11/77* (2018.01)

(58) Field of Classification Search
CPC . F24F 11/30; F24F 11/62; F24F 11/77; Y02B 30/70
See application file for complete search history.

(56) References Cited

U.S. PATENT DOCUMENTS

| | | | | |
|---|---|---|---|---|
| 4,045,973 A | * | 9/1977 | Anderson | F24F 11/88 62/158 |
| 4,308,911 A | * | 1/1982 | Mandl | F24F 11/61 340/521 |
| 4,884,214 A | * | 11/1989 | Parker | F24F 11/523 700/278 |
| 4,931,948 A | * | 6/1990 | Parker | F24F 11/88 236/1 C |
| 5,492,273 A | * | 2/1996 | Shah | F24F 11/88 236/11 |
| 5,682,329 A | * | 10/1997 | Seem | G01F 15/063 236/49.5 |
| 5,692,676 A | * | 12/1997 | Walker | F24H 15/219 237/19 |
| 5,818,194 A | * | 10/1998 | Nordby | F04D 27/004 318/108 |

(Continued)

*Primary Examiner* — Eric S Ruppert
*Assistant Examiner* — Kirstin U Oswald
(74) *Attorney, Agent, or Firm* — Armstrong Teasdale LLP

(57) ABSTRACT

An interface module and methods for controlling a motor in a heating, ventilation, and air conditioning (HVAC) system are provided. The interface module is configured to determine an operating mode selected from a plurality of operating modes of the HVAC system based on at least one signal received from at least one of a first device and a second device, determine a motor operating parameter at which to operate the motor based on the determined operating mode, and control the motor in accordance with the motor operating parameter.

18 Claims, 2 Drawing Sheets

(56) References Cited

U.S. PATENT DOCUMENTS

| | | | | |
|---|---|---|---|---|
| 5,847,526 | A * | 12/1998 | Lasko | F24F 11/63 388/934 |
| 5,944,098 | A * | 8/1999 | Jackson | F24F 11/46 165/207 |
| 6,108,614 | A * | 8/2000 | Lincoln | F24F 11/52 702/183 |
| 6,155,341 | A * | 12/2000 | Thompson | F24F 11/67 165/265 |
| 6,250,560 | B1 * | 6/2001 | Kline | G05D 7/0635 454/258 |
| 6,330,806 | B1 * | 12/2001 | Beaverson | G05B 19/0426 62/298 |
| 7,106,019 | B2 | 9/2006 | Becerra | H02P 6/34 318/471 |
| 8,011,199 | B1 * | 9/2011 | Chen | F24F 11/77 62/157 |
| 8,143,828 | B2 * | 3/2012 | Becerra | F24F 11/62 318/471 |
| 8,362,725 | B2 * | 1/2013 | Becerra | F24F 11/30 318/471 |
| 8,643,315 | B2 * | 2/2014 | Butler | F24F 11/77 318/600 |
| 8,766,573 | B2 * | 7/2014 | Becerra | F24F 11/67 318/471 |
| 9,093,934 | B2 * | 7/2015 | Stout | H02P 6/08 |
| 9,644,856 | B1 * | 5/2017 | Francis | F24F 11/49 |
| 9,863,852 | B2 * | 1/2018 | Krishnamoorthy | H02H 7/0844 |
| 10,627,128 | B1 * | 4/2020 | Zhang | F24F 11/77 |
| 10,816,233 | B2 * | 10/2020 | Muniganti | F24F 11/49 |
| 2004/0219875 | A1 * | 11/2004 | Mills | F24F 11/62 454/256 |
| 2005/0082277 | A1 * | 4/2005 | Jones | F24F 11/80 219/494 |
| 2005/0278071 | A1 * | 12/2005 | Durham, III | F24F 11/30 700/276 |
| 2005/0288822 | A1 * | 12/2005 | Rayburn | F24F 11/30 236/46 R |
| 2007/0152613 | A1 * | 7/2007 | Mullin | F04D 27/004 318/432 |
| 2008/0156887 | A1 | 7/2008 | Stanimirovic | |
| 2009/0037142 | A1 * | 2/2009 | Kates | F24F 11/52 702/182 |
| 2009/0082908 | A1 * | 3/2009 | Green | F24F 11/62 703/2 |
| 2009/0171512 | A1 * | 7/2009 | Duncan | F24F 11/30 62/157 |
| 2009/0208333 | A1 | 8/2009 | Smith et al. | |
| 2009/0261767 | A1 * | 10/2009 | Butler | F24F 11/77 318/445 |
| 2010/0033119 | A1 * | 2/2010 | Becerra | F24F 11/77 236/51 |
| 2010/0076605 | A1 * | 3/2010 | Harrod | F24F 11/30 700/276 |
| 2010/0106309 | A1 * | 4/2010 | Grohman | G05D 23/1931 700/276 |
| 2010/0106328 | A1 | 4/2010 | Li et al. | |
| 2011/0066289 | A1 * | 3/2011 | Butler | F24F 11/77 700/276 |
| 2011/0146651 | A1 * | 6/2011 | Puranen | F24D 5/04 126/116 A |
| 2011/0181216 | A1 * | 7/2011 | Bass | H02P 6/28 318/400.11 |
| 2011/0260671 | A1 * | 10/2011 | Jeung | H02P 6/08 29/402.08 |
| 2012/0161682 | A1 * | 6/2012 | Becerra | F24F 11/30 165/104.34 |
| 2012/0212166 | A1 * | 8/2012 | Merkel | F24F 11/77 318/400.08 |
| 2012/0221150 | A1 * | 8/2012 | Arensmeier | G05B 23/0221 702/183 |
| 2012/0260002 | A1 | 10/2012 | Hildebran et al. | |
| 2013/0013118 | A1 * | 1/2013 | Merkulov | G05D 23/1902 700/286 |
| 2014/0014291 | A1 * | 1/2014 | Kraft | F24F 11/30 165/247 |
| 2014/0277748 | A1 | 9/2014 | Dyess et al. | |
| 2015/0168003 | A1 * | 6/2015 | Stefanski | F24F 11/64 165/268 |
| 2015/0330650 | A1 * | 11/2015 | Abiprojo | F24F 11/30 700/276 |
| 2015/0330861 | A1 * | 11/2015 | Alsaleem | F24F 11/49 702/183 |
| 2016/0313752 | A1 | 10/2016 | Przybylski | |
| 2016/0370026 | A1 | 12/2016 | Denton et al. | |
| 2016/0377309 | A1 | 12/2016 | Abiprojo et al. | |
| 2017/0089603 | A1 * | 3/2017 | Bentz | F24F 11/871 |
| 2017/0318701 | A1 | 11/2017 | Steiner | |
| 2018/0356847 | A1 * | 12/2018 | Mohalley | F24F 11/62 |
| 2019/0277527 | A1 * | 9/2019 | Muniganti | F24F 11/58 |

\* cited by examiner

SYSTEMS AND METHODS FOR CONTROLLING A MOTOR

CROSS-REFERENCE TO RELATED APPLICATIONS

This application is a continuation application of U.S. patent application Ser. No. 15/618,846, filed on Jun. 9, 2017, which is hereby incorporated by reference herein in its entirety.

BACKGROUND

The embodiments described herein relate generally to motors, and more particularly, to systems and methods for controlling a motor in a heating, ventilation, air conditioning (HVAC) system.

Motors used in HVAC and fluid circulation systems often must be programmed to operate according to the specific needs of their systems and may need to be replaced when they do not operate properly or fail. Typically, the motors are programmed using a specialized motor programming computer by an Original Equipment Manufacturers (OEM) at a motor manufacturing facility, at the point of sale, or at an assembly plant.

OEMs that utilize configurable/intelligent motors configure each motor to meet the requirements of the specific product and the expected application. The functionality of the OEM system is derived from a combination of the motor's configuration and the operation of an HVAC system controller. For example, signal definitions/functions associated with a system controller wiring harness are determined by the motor's configuration. With each replacement configurable/intelligent motor needing to be ordered with the specific OEM system configuration, returning a failed system to operation may be a time consuming and expensive process.

BRIEF DESCRIPTION

In one aspect, a heating, ventilation, and air conditioning (HVAC) system is provided. The HVAC system includes a second motor that has replaced a first motor, a system controller previously coupled to and configured to transmit instructions for control of the first motor according to a previous configuration, and an interface module communicatively coupled between the system controller and the second motor when the second motor has replaced the first motor. The interface module is configured to receive, via a communication interface, after the second motor has replaced the first motor, a first input signal from a thermostat of the HVAC system and a second input signal from the system controller, and compare an aggregate signal of the first and second input signals with stored reference information to determine an intended operating mode, from a plurality of operating modes, of the HVAC system, The interface module is also configured to determine an operating parameter at which to operate the second motor based on the determined operating mode, transmit a control signal to the second motor to control the second motor according to the operating parameter, and provide a motor output feedback signal to the system controller based on operation of the second motor according to the operating parameter.

In another aspect, an interface module for controlling a second motor in a heating, ventilation, and air conditioning (HVAC) system is provided. The interface module includes a memory, a communication interface, and a processor communicatively coupled to the memory and the communication interface. The processor is programmed to receive, via the communication interface, after the second motor has replaced the first motor, a first input signal from a thermostat of the HVAC system and a second input signal from the system controller, and compare an aggregate signal of the first and second input signals with stored reference information to determine an intended operating mode, from a plurality of operating modes, of the HVAC system. The processor is also programmed to determine an operating parameter at which to operate the second motor based on the determined operating mode, transmit a control signal to the second motor to control the second motor according to the operating parameter, and provide a motor output feedback signal to the system controller based on operation of the second motor according to the operating parameter.

In one aspect, an interface module configured to control a motor in a heating, ventilation, and air conditioning (HVAC) system is provided. The interface module is configured to determine an operating mode selected from a plurality of operating modes of the HVAC system based on at least one signal received from at least one of a first device and a second device, determine a motor operating parameter at which to operate the motor based on the determined operating mode, and control the motor in accordance with the motor operating parameter.

In another aspect, a method controlling a motor in a heating, ventilation, and air conditioning (HVAC) system using an interface module is provided. The method includes determining an operating mode selected from a plurality of operating modes of the HVAC system based on at least one signal received from at least one of a first device and a second device, determining a motor operating parameter at which to operate the motor based on the determined operating mode, and controlling the motor in accordance with the motor operating parameter.

DETAILED DESCRIPTION

Figure 1:
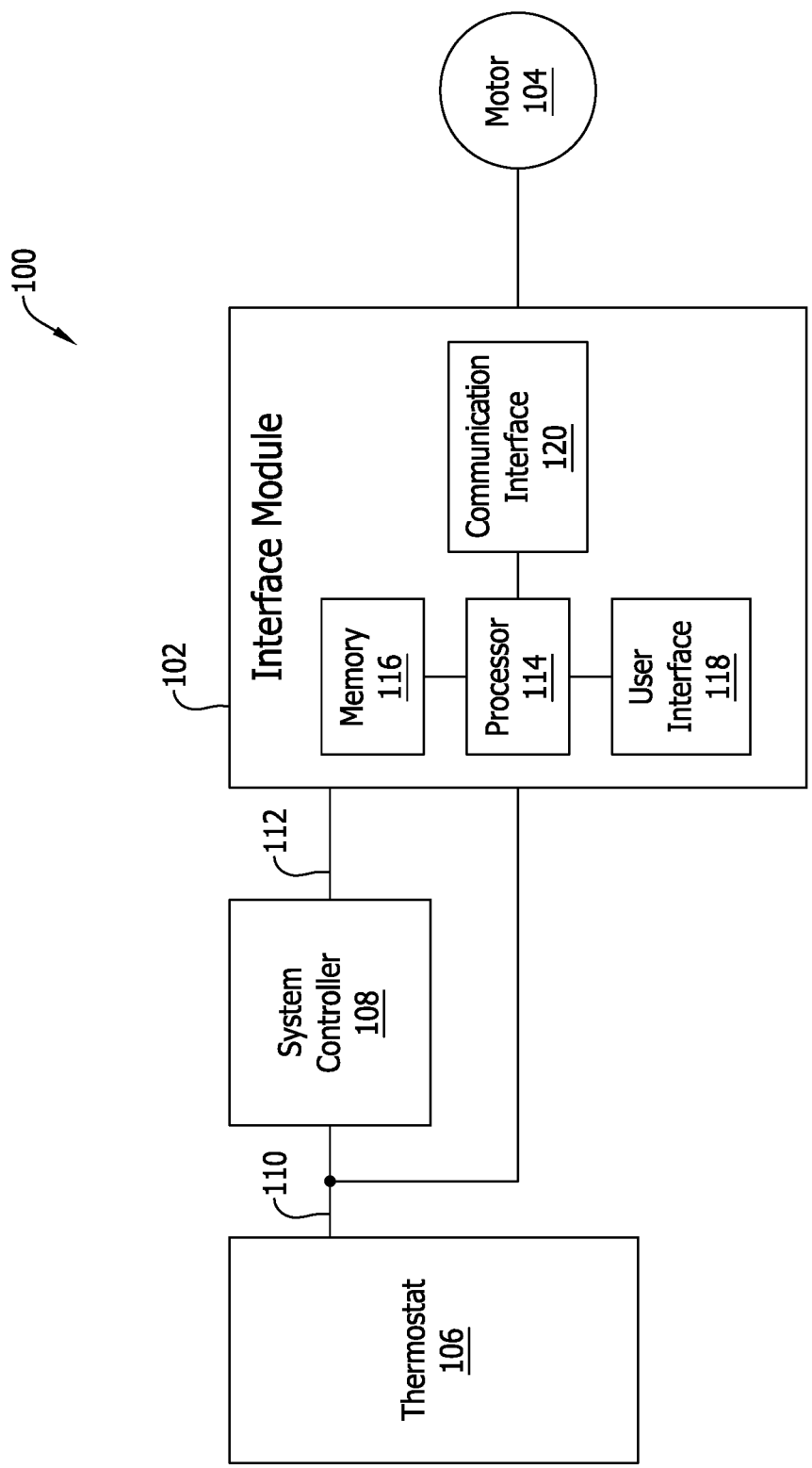
FIG. 1 is a schematic diagram of an exemplary HVAC system that includes an interface module for controlling a motor.

FIG. 1 is a schematic diagram of a heating, ventilation, and air conditioning (HVAC) system 100 that includes an interface module 102 and a retrofit motor 104. HVAC system 100 also includes a thermostat 106 and a system controller 108. Interface module 102 is coupled to and configured to receive signals from both thermostat 106 and system controller 108. Further, interface module 102 is coupled to and configured to transmit signals to motor 104.

In the exemplary embodiment, motor 104 is an electronically commutated motor (ECM), which may also be referred to as a brushless direct current (DC) motor. Motor 104 is utilized as a fan and/or blower motor in HVAC system 100. Alternatively, motor 104 may be implemented in any other application including, but not limited to, a fluid (e.g., water, air, etc.) moving system, a clean room filtering system, a fan filter unit, a variable air volume system, a refrigeration system, a furnace system, and/or an air conditioning system. In the exemplary embodiment, HVAC system 100 is retrofit to include motor 104 that replaces an existing ECM or permanent split capacitor (PSC) motor (hereinafter referred to as "replaced motor", not shown).

Thermostat 106 is configured to control a mode in which HVAC system 100 is operating, for example, a cooling mode, a heating mode, or a fan only mode, and/or at a first stage or at a second stage. Thus, in the exemplary embodiment, thermostat 106 includes plurality of thermostat leads 110 associated with one or more of a cooling output, a heating output, a fan output, a first stage output, and a second stage output. However, thermostat 106 is not limited to these outputs and may include any number of outputs that enables thermostat 106 to function as described herein. Thermostat 106 generates at least one thermostat signal that is transmitted to at least one of interface module 102 and system controller 108.

System controller 108 includes a system controller wiring harness 112 that was originally coupled to and configured to transmit instructions to the replaced motor. When interface module 102 is provided during the replacement process, system controller wiring harness 112 is coupled to and configured to communicate with interface module 102. For example, system controller 108 relays signals generated by thermostat 106 to interface module 102. More specifically, system controller 108 processes the thermostat signal and generates instructions for operating motor 104 that are provided to interface module 102. System controller 108 may also communicate with other input/output devices, such as humidity control systems, gas burner controls, gas ignition systems, other motors, safety systems, service systems, and/or combustion blowers. Accordingly, system controller 108 generates operating instructions for motor 104 based on signals received from thermostat 106, as well as signals received from alternative devices coupled to system controller 108, such as safety systems, ambient sensors, gas ignition systems, and other HVAC system components.

Interface module 102 receives signals from at least one of thermostat 106 and system controller 108. Based on the received signals, interface module 102 provides motor 104 with control signals. More specifically, interface module 102 receives signals from thermostat leads 110, as well as from system controller 108 via system controller wire harness 112, and is configured to provide motor 104 with a signal that selects a desired motor control profile.

In the exemplary embodiment, interface module 102 includes components mounted to a printed circuit board. More specifically, in the exemplary embodiment, interface module 102 includes a processing device 114, a memory device 116, a user interface 118, and a communication interface 120.

The term processing device, as used herein, refers to central processing units, microprocessors, microcontrollers, reduced instruction set circuits (RISC), application specific integrated circuits (ASIC), logic circuits, and any other circuit or processor capable of executing the functions described herein.

It should be noted that the embodiments described herein are not limited to any particular processor for performing the processing tasks of the invention. The term "processor," as that term is used herein, is intended to denote any machine capable of performing the calculations, or computations, necessary to perform the tasks of the invention. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks described herein, as will be understood by those skilled in the art.

Communication interface 120 may include an RS-485 connector, a digital serial interface (DSI) connector, a control wire reception terminal, and/or any other type of interface that allows a user, thermostat 106, and/or system controller 108 to provide a control signal to interface module 102. For example, the control signal may include a 0-10 volts direct current (VDC) control signal, a 0-5 VDC control signal, a 4-20 milliampere (mA) control signal, and/or any other type of control signal that allows interface module 102 to function as described herein.

In the exemplary embodiment, interface module 102 also includes memory device 116. Memory device 116 may be included within processing device 114, or may be coupled to processing device 114. In the exemplary embodiment, memory device 116 stores a plurality of different communications protocols. For example, processing device 114 may access the communications protocols stored in memory device 116 in order to translate a signal received from a user via communication interface 120 into a format that may be transmitted to motor 104. More specifically, processing device 114 may receive a signal sent using an Ethernet protocol, in which motor 104 may not be compatible. Processing device 114 translates the received signal to a communication suitable to be transmitted to motor 104.

Interface module 102 includes a user interface 118 that enables user-interaction with interface module 102 and enables interface module 102 to provide feedback with regards to its operation. User interface 118 facilitates configuration (i.e., setup) of interface module 102. Original ECM functionality that is being replicated by interface module 102 is enabled via user interface 118. User interface 118 further enables selection of operational values such as "ON" delay times, "OFF" delay times, duty cycle values, etc.

User interface 118 includes a plurality of buttons/switches and a display. The display provides information relating to the operation of interface module 102 including, but not limited to, system control signals status, thermostat signals status, system operating mode, motor torque percent, and/or delay activity. The display is also configured to provide diagnostic (e.g., system health) and self-test information.

Alternatively, interface module 102 may be implemented as a "black box" void of any buttons/switches or display. In this implementation, interface module 102 communicates with an intelligent wireless device (e.g., smartphone, tablet, PDA, etc., not shown) using wireless communication (e.g., Wi-Fi, Bluetooth, RFID, etc.) via communication interface 120. The wireless device runs/executes an application that provides user interface 118 and feedback functions.

Interface module 102 is configured to determine an operating mode of HVAC system 100 (heat, cool, etc.). When the configuration of the replaced motor and the operations of system controller 108 are unknown, thermostat signals and the motor control signals from system controller 108 enable determination of the operating mode of HVAC system 100. Interface module 102 continuously or periodically monitors an aggregate signal of the system controller signals and the thermostat signals, and compares the resulting aggregate signal with stored reference information to determine the operating mode of the system.

In the exemplary embodiment, to acquire the information necessary for determining the system operating mode, interface module 102 is configured to "learn" the HVAC system's operation by implementing a learning algorithm that, over time, enables interface module 102 to recognize and store as a reference the system and thermostat signal combinations and timing that are used to resolve the operating mode of HVAC system 100. In some embodiments, interface module 102 is configured to discriminate between discrete and variable speed motor control as well as recognize a single stage thermostat that is paired with a dual stage system.

In another embodiment, the information necessary for determining the system operating mode is acquired by teaching interface module 102 to recognize system and thermostat signal combinations. While exercising HVAC system 100 throughout its different modes of operation, the installer manually triggers interface module 102 to capture a "snapshot" of the available inputs for each mode of operation. Interface module 102 correlates each mode of operation with a respective snapshot to identify the system operating modes. A snapshot is a unique combination of states of individual system and thermostat signals, i.e., inputs.

In yet another embodiment, interface module 102 acquires the information necessary for determining the system operating mode via manual configuration of interface module 102 with the appropriate information by a technician or installer of motor 104.

Interface module 102 is configured to implement "ON" delays and "OFF" delays in HVAC systems that allocate this functionality to motor 104. More specifically, interface module 102 facilitates enabling/disabling and/or selecting time values for ON delays and OFF delays for the appropriate system operating modes in order to complete/replicate the HVAC system performance.

Interface module 102 is configured to provide feedback to be utilized by HVAC system 100 to satisfy expectations of system controller 108. Specifically, interface module 102 facilitates enabling/disabling and/or selecting one of a plurality of available motor output signal types. This feature is realized by pairing interface module 102 with a known retrofit/replacement motor that provides a fundamental motor output signal that interface module 102 modifies based on its configuration and passes on to system controller 108.

Interface module 102 is further configured to control motor 104. In operating motor 104, interface module 102 provides a control signal to motor 104 based on signals received from thermostat 106 and system controller 108. In the exemplary embodiment, motor 104 is a "communicating" ECM motor and interface module 102 controls motor 104 using commands. For example, the physical layer of interface module 102 may include serial, controller area network (CAN), wireless, bus, and/or any other standard communications interface/protocol. Interface module 102 provides a single control signal that includes an industry recognized, standard PWM signal to drive motor 104. A duty cycle of the control signal corresponds to a percent of full torque that may be generated by motor 104.

In an alternative embodiment, where motor 104 may need unique programming, such as field programming, for each system, interface module 102 is configured to provide a 0 to 10 Vdc control signal to motor 104.

Interface module 102 in combination with motor 104 is configured to affect airflow that assures safe operation of HVAC system 100. Interface module 102 maintains (e.g., in non-volatile memory) a duty cycle value for each operating mode of HVAC system 100. Initially, default values are used to operate motor 104. During installation, a service technician verifies the airflow in all operating modes to ensure that the temperature rise of fossil fuel heating systems and the CFM per ton of cooling meet OEM specifications. Interface module 102 provides a user interface 118 for making adjustments to the stored duty cycle values as determined by the technician.

Figure 2:
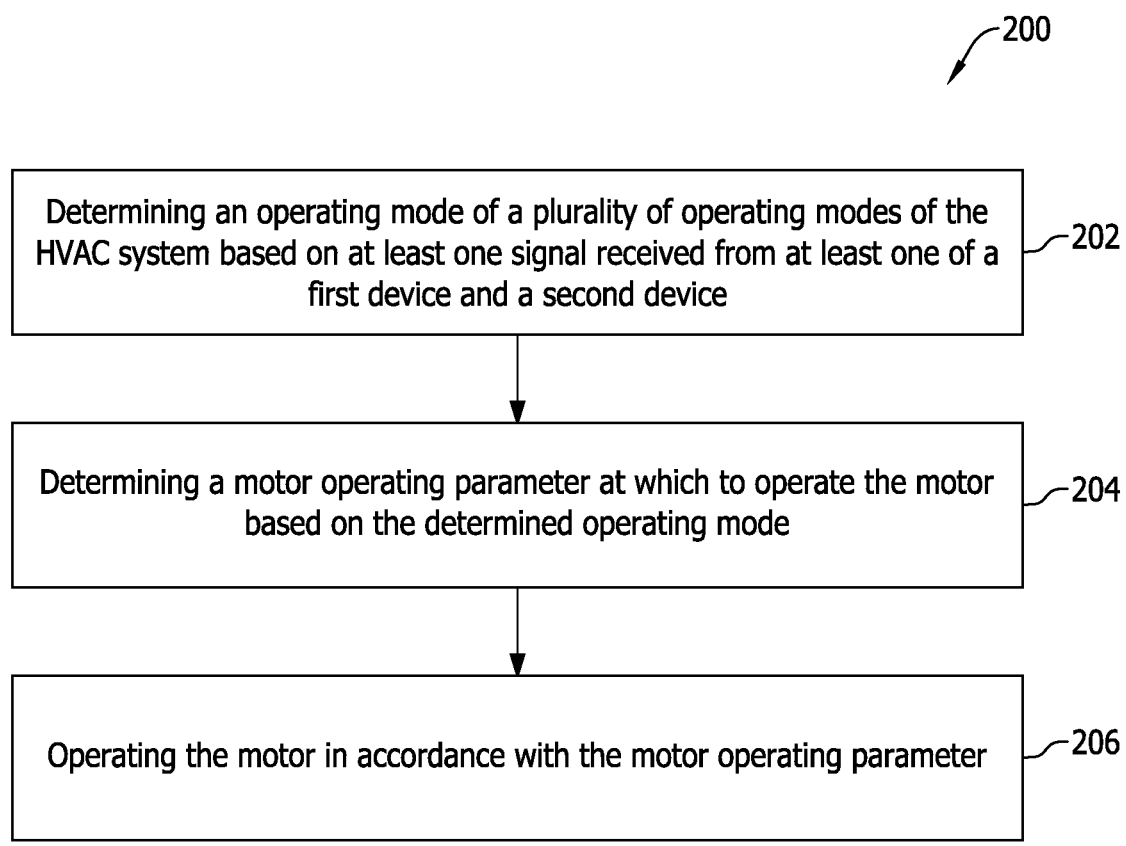
FIG. 2 is a flowchart of an exemplary method of controlling a motor using the interface module shown in FIG. 1.

FIG. 2 is a flowchart of an exemplary method 200 of controlling a motor in a HVAC system using interface module 102 (shown in FIG. 1).

Initially, method 200 includes determining 202 an operating mode of a plurality of operating modes of the HVAC system based on at least one signal received from at least one of a first device and a second device. In some embodiments, the first device may be a thermostat and the second device may be a system controller of the HVAC system. Method 200 also includes determining 204 a motor operating parameter at which to control the motor based on the determined operating mode. Method 200 further includes operating 206 the motor in accordance with the motor operating parameter.

In one embodiment, method 200 may include continuously monitoring an aggregate signal of the system controller signals and the thermostat signals, and comparing the resulting aggregate signal with stored reference information to determine the operating mode of the HVAC system.

In another embodiment, to determine the operating mode of the HVAC system, method 200 may include implementing, by the interface module, an algorithm that, over time, recognizes and stores as a reference, the first and second device signal combinations and timing.

In another embodiment, wherein to operate the motor, method 200 may include transmitting a pulse width modulation (PWM) signal that represents the motor operating parameter, wherein a duty cycle of the PWM signal corresponds to a percent of full torque that may be generated by motor.

In another embodiment, method 200 may include receiving, via a user interface of the interface module, operational values input by a user, the operational values including at least one of ON delay times, OFF delay times, and duty cycle values, and implementing the operational values prior to operating the motor.

The embodiments described herein provide an interface module and methods of controlling a motor. The embodiments facilitate determining an operating mode of a plurality of operating modes of the HVAC system based on at least one signal received from at least one of a first device and a second device, determining a motor operating parameter at which to operate the motor based on the determined operating mode, and controlling the motor in accordance with the motor operating parameter. The interface module facilitates replacing or retrofitting a failed motor in a HVAC system with a readily available, stock, retrofit/replacement motor. The interface module provides a cost-effective solution to interfacing between HVAC system controllers, thermostats and replacement motors. Further, the interface module facilitates returning a failed HVAC system to operation quickly and efficiently (e.g., in one service call).

Exemplary embodiments of the interface module and methods of controlling a motor are described above in detail. The interface module and methods are not limited to the specific embodiments described herein, but rather, components of the interface module and/or steps of the method may be utilized independently and separately from other components and/or steps described herein. For example, the control system and methods may also be used in combination with other motor systems and methods, and are not limited to practice with only the HVAC system as described herein.

Rather, the exemplary embodiments can be implemented and utilized in connection with many other system applications or other support.

A technical effect of the system described herein includes at least one of: (a) determining an operating mode of a plurality of operating modes of the HVAC system based on at least one signal received from at least one of a first device and a second device; (b) determining a motor operating parameter at which to operate the motor based on the determined operating mode; (c) controlling the motor in accordance with the motor operating parameter; (d) replacing or retrofitting a failed motor in a HVAC system with a readily available, stock, retrofit/replacement motor; (e) provides a cost-effective solution to interfacing between HVAC system controllers, thermostats and replacement motors; and (f) facilitates returning a failed HVAC system to operation quickly and efficiently.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heating, ventilation, and air conditioning (HVAC) system comprising:
    a second motor that has replaced a first motor;
    a system controller previously coupled to and configured to transmit instructions for control of the first motor according to a previous configuration; and
    an interface module communicatively coupled between the system controller and the second motor when the second motor has replaced the first motor, the interface module configured to:
        receive, via a communication interface, after the second motor has replaced the first motor, a first input signal from a thermostat of the HVAC system and a second input signal from the system controller;
        compare an aggregate signal of the first and second input signals with stored reference information to determine an intended operating mode, from a plurality of operating modes, of the HVAC system;
        determine an operating parameter at which to operate the second motor based on the determined operating mode;
        transmit a control signal to the second motor to control the second motor according to the operating parameter;
        receive a fundamental motor output signal from the second motor operating according to the operating parameter;
        modify the fundamental motor output signal to generate a motor output feedback signal; and
        provide the motor output feedback signal to the system controller.

2. The HVAC system of claim 1, wherein the system controller includes a wiring harness previously coupled to the first motor, and wherein the interface module is communicatively coupled to the system controller via the wiring harness when the second motor has replaced the first motor.

3. The HVAC system of claim 1, wherein the interface module is configured to transmit instructions for control of the second motor according to a replacement configuration.

4. The HVAC system of claim 1, wherein the interface module is configured to receive, via the communication interface, user input of operational values.

5. The HVAC system of claim 4, wherein the operational values include ON delays for each operating mode, OFF delays for each operating mode, or duty cycles for each operating mode.

6. The HVAC system of claim 5, wherein the interface module is further configured to implement the operational values prior to transmitting the control signal to control the second motor.

7. The HVAC system of claim 4, wherein the interface module is configured to receive the user input from a remote device wirelessly communicatively coupled to the interface module.

8. The HVAC system of claim 1, wherein the interface module is further configured to implement at least one operational value prior to transmitting the control signal to the second motor, wherein the operational value includes an ON delay for each operating mode, an OFF delay for each operating mode, or a duty cycle for each operating mode.

9. The HVAC system of claim 1, wherein the interface module is configured to receive the first input signal via thermostat leads of the thermostat and the second input signal via a wiring harness of the system controller.

10. The HVAC system of claim 1, wherein the interface module is configured to receive the first and second input signals via a wiring harness of the system controller.

11. The HVAC system of claim 1, wherein the interface module is configured to modify the fundamental motor output signal from the second motor based upon a replacement configuration of the interface module and the system controller.

12. An interface module for controlling a second motor in a heating, ventilation, and air conditioning (HVAC) system, the interface module comprising:
    a memory;
    a communication interface; and
    a processor communicatively coupled to the memory and the communication interface, the processor programmed to:
        receive, via the communication interface, after the second motor has replaced the first motor, a first input signal from a thermostat of the HVAC system and a second input signal from a system controller of the HVAC system;
        compare an aggregate signal of the first and second input signals with stored reference information to determine an intended operating mode, from a plurality of operating modes, of the HVAC system;
        determine an operating parameter at which to operate the second motor based on the determined operating mode;
        transmit a control signal to the second motor to control the second motor according to the operating parameter;
        receive a fundamental motor output signal from the second motor operating according to the operating parameter;

modify the fundamental motor output signal to generate a motor output feedback signal; and provide the motor output feedback signal to the system controller.

13. The interface module of claim 12, wherein the processor is programmed to receive, via the communication interface, user input of operational values.

14. The interface module of claim 13, wherein the operational values include ON delays for each operating mode, OFF delays for each operating mode, or duty cycles for each operating mode.

15. The interface module of claim 14, wherein processor is further programmed to implement the operational values prior to transmitting the control signal to control the second motor.

16. The interface module of claim 13, wherein the processor is further programmed to receive, via the communication interface, the user input from a remote device wirelessly communicatively coupled to the interface module.

17. The interface module of claim 12, wherein the processor is further programmed to implement at least one operating value prior to transmitting the control signal to the second motor, wherein the operational value includes an ON delay for each operating mode, an OFF delay for each operating mode, or a duty cycle for each operating mode.

18. The interface module of claim 12, wherein the processor is programmed to modify the fundamental motor output signal from the second motor based upon a replacement configuration of the interface module and the system controller.

* * * * *